March 20, 1945.  V. E. HAMILTON, JR  2,371,887
LOADING AND UNLOADING APPARATUS
Filed April 9, 1943  3 Sheets-Sheet 1
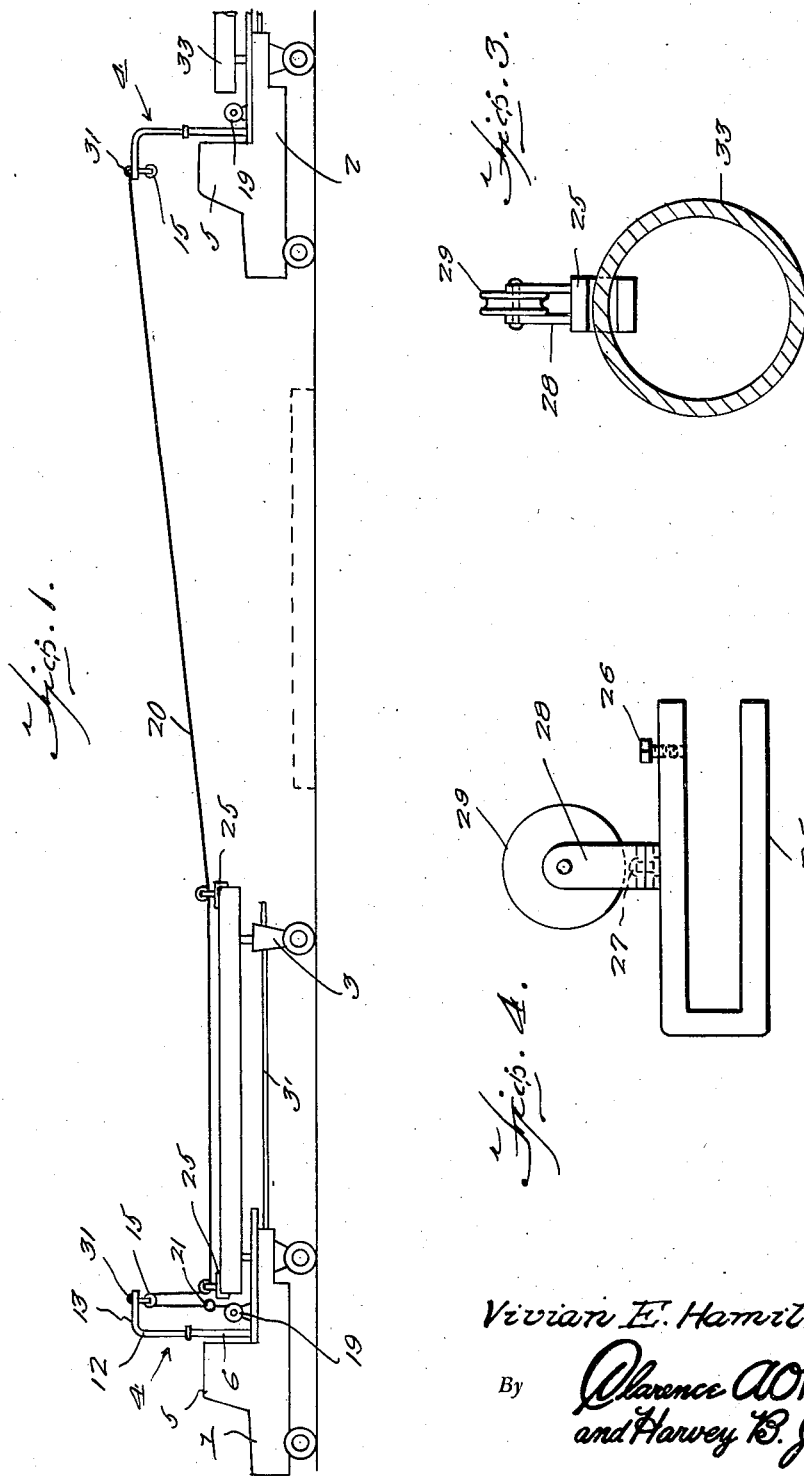
Inventor
Vivian E. Hamilton, Jr.
By Clarence A. O'Brien
and Harvey B. Jacobson
Attorneys

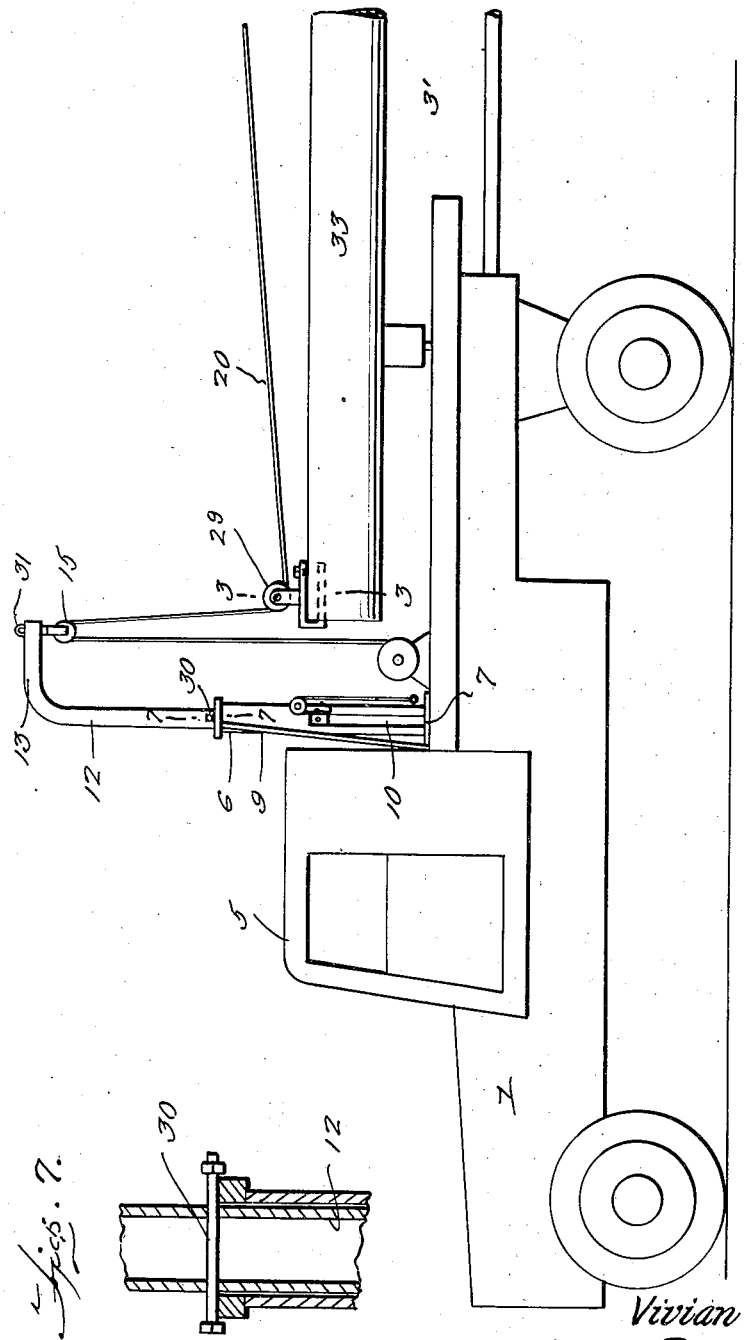

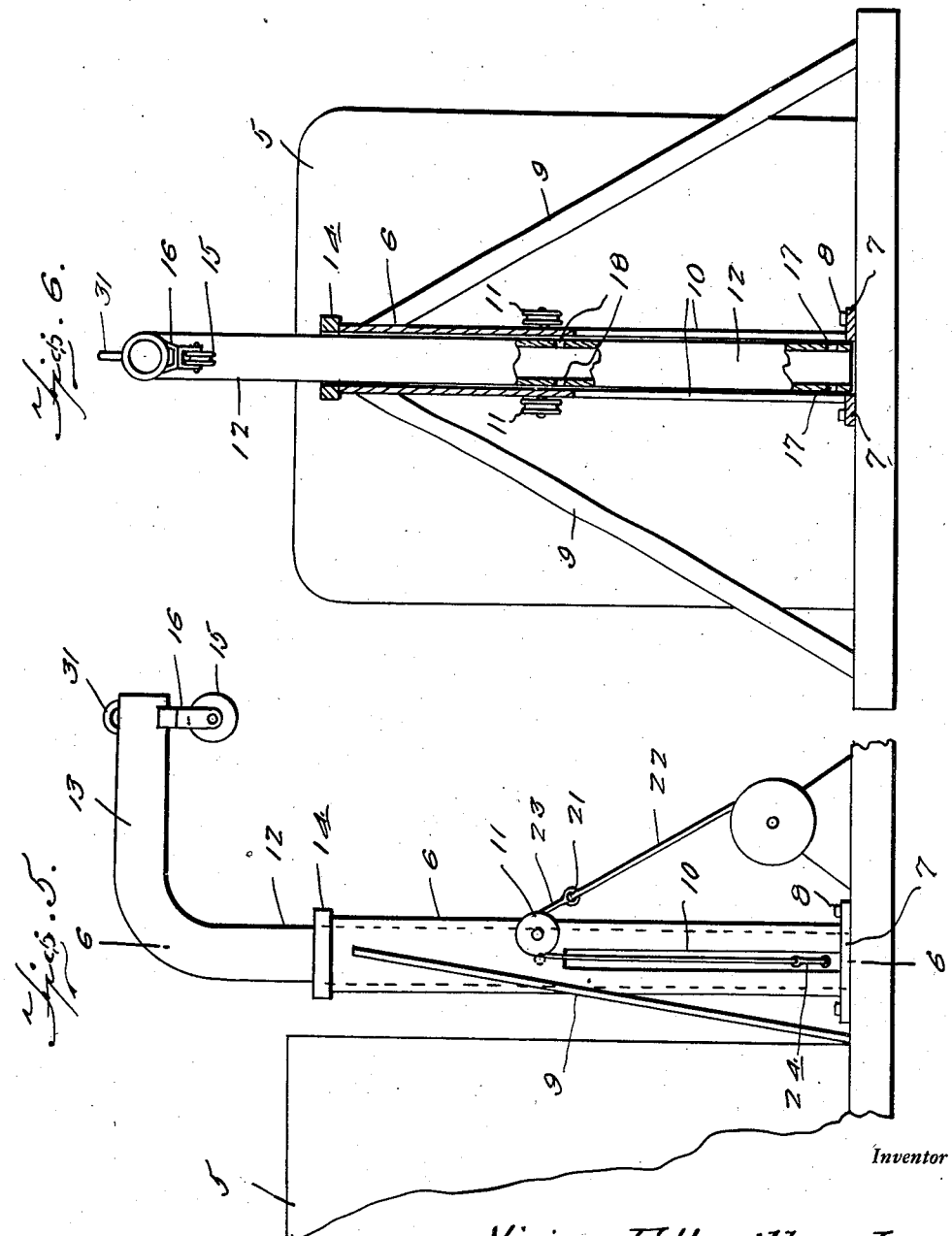

Patented Mar. 20, 1945

2,371,887

UNITED STATES PATENT OFFICE 2,371,887

LOADING AND UNLOADING APPARATUS

Vivian Earle Hamilton, Jr., Shreveport, La.

Application April 9, 1943, Serial No. 482,431

2 Claims. (Cl. 214—38)

My invention relates to improvements in loading and unloading apparatus for automotive trucks, the principal object in view being to provide simply constructed means adapted for installation on the beds of a pair of truck bodies as permanent equipment, and which is easily operative by the usual winches with which such trucks are provided to unload from the truck and load thereon such freight as heavy pipe sections and with safety to operators of the apparatus. Other and subordinate objects are also comprehended by my invention, all of which, together with the precise nature of my improvements, will be readily understood when the succeeding description and claims are read with reference to the drawings accompanying and forming part of this specification.

In said drawings:

Figure 1 is a view in side elevation illustrating diagrammatically a pair of automotive trucks equipped with my improved apparatus conditioned for unloading, or loading, one of the trucks, Figure 2 is a view in side elevation of one of the trucks equipped with my improved apparatus and drawn to an enlarged scale, Figure 3 is a view in transverse section taken on the line 3—3 of Figure 2, Figure 4 is a detail view in side elevation of one of the clamps drawn to an enlarged scale, Figure 5 is a detail view in side elevation drawn to a further enlarged scale and illustrating the apparatus conditioned for elevating the shaft of one of the hoisting units, Figure 6 is a view partly in rear elevation and partly in vertical section taken on the line 6—6 of Figure 5, and Figure 7 is a fragmentary view in vertical section taken on the line 7—7 of Figure 2 and drawn to an enlarged scale.

Referring to the drawings by numerals, according to my invention a pair of automotive trucks 1, 2 of the four-wheeled type and each including a trailer truck 3 connected to the truck proper by a reach pole 3' are equipped as follows:

Each truck carries a hoisting unit 4 directly in the rear of the usual cab 5. Each hoisting unit 4 comprises as its basic element a hollow cylindrical column 6 provided with a base flange 7 by means of which and bolts 8 the column is secured, preferably, on the bed of the body of the truck in upstanding position and in the longitudinal center of the bed. Any suitable arrangement of struts 9 may be utilized for bracing the column 6, in each instance, against lateral sway. A pair of diametrically opposite slots 10 are provided in each column 6 to extend from the base flange 7 partly up opposite sides of the column, respectively. A pair of horizontal axis pulleys 11 are provided on each column 6 upon opposite sides of the same and adjacent the upper ends of the slots 10.

Vertically slidable in each column 6 is a preferably tubular shaft 12 adapted to normally rest at its lower end on the bed of the truck and provided at its upper end, above the level of the top of the cab 5, with a right angled crane-forming arm 13. A stop collar 14 is slidably mounted on each shaft 12 to rest on top of the column 6 for a purpose presently seen. The outer end of each crane arm 13 is provided with an underslung sheave 15 swiveled thereon as by the swivel mounting 16. A pair of diametrically opposite apertures 17 are provided in the lower end of each shaft 12 in registration with the slots 10, and a similarly arranged pair of apertures 18 are also provided in the shaft above the apertures 17 and which are located so that when the apertures 17 are disposed adjacent the upper ends of the slots 10, by elevation of the shaft 12, the apertures 18 will be raised just above the stop collar 14 on said shaft.

The described column 6, in each instance, is arranged forwardly of the usual power-hoisting winch 19 with which such trucks are usually provided. The winches 19, according to my invention, are designed to wind up and unwind opposite ends of a cable line 20 adapted to be trained upwardly from the winches over the sheaves 15, as shown in Figures 1 and 2, and attached to the winches, respectively, as by a ring 21 on a short cable line 22 attached to each winch 19 and one of which is shown in Figures 1 and 2.

A pair of short link cables, as at 23, is provided for each unit 4 for attachment at one end to the ring 21 of the short line 22 of the winch 19 and training over the pulleys 11, the other end of the lines 23 being equipped with hooks 24 for attaching in the apertures 17 of the shaft 6.

A pair of U clamps 25 of a suitable type for straddling the edge of a pipe section at the ends thereof is provided for suspension from the cable line 20 between the hoisting units of the pair of trucks 1, 2 when arranged as presently described. Each clamp 25 is provided with a clamping bolt 26 and is swiveled, as at 27, in a sheave block 28 carrying a sheave 29 designed to ride on the cable line 20.

A pair of stop bolts, as at 30, is provided for insertion in the apertures 18 of the shafts 12, respectively, in a manner and for a purpose presently clear.

Each crane arm 13 is equipped on top thereof with an end U bolt 31 for attachment of one end of the cable line thereto as occasion may require.

Referring now to the use and operation of the invention, in unloading one of the pairs of trucks 1, 2, loaded with pipe sections, as at 33, the trucks of said pair are parked in line a suitable distance apart to provide for lowering the pipe sections therebetween. Preferably, the truck, for instance, 1, to be unloaded is arranged ahead of the other truck 2 with said other truck arranged head-on behind the truck 1. The pairs of cables 22 are hooked up to the short lines 23 of the winches 19 and to the lower ends of the shafts 12 in the manner already described, and the winches 19 operated to elevate the shafts 12 until the hooks 24 are close to the upper ends of the slots 10 of the columns 6. At this point in the elevation of the shafts 12, the apertures 18 will be raised just above the collars 14. The winches 19 are then stopped and the bolts 30 inserted through the pairs of apertures 18 to bear against the collars 14 and thereby maintain the shafts 12 elevated. The short lines 23 are then detached from the short lines 22. The cable line 20 is next trained over the sheave 15 of the unit 4 associated with the truck, designated 1 in this instance, to be unloaded, and one end thereof attached to the short line 22 of the winch 19 of said truck. With the described clamps 25 strung on the line 20 between the units 4 of the trucks 1, 2, the other end of said line 20 is attached to the U bolt 31 of the crane arm 13 of the other truck 2 and with the shaft 12 of said last unit turned in the column 6 to project the crane arm forwardly over the cab 5 for reasons which will be clear. The pair of clamps 25 are next attached, in a manner which will now be understood, to the opposite ends of a section 33 of the pipe. The section of pipe may then be lifted off the truck 1 by operation of the winch 19 of the truck, shoved along the cable 20 by means of the sheaves 29 into a position intermediate the pair of trucks 1, 2, and then lowered to the ground, or other support, by operation of the winch 19 of the truck 1 to slacken up on the cable line 20. The clamps 25 may then be detached. The manner in which the other truck 2 may be unloaded, or either truck loaded, will, it is believed, be apparent from the preceding description relative to unloading the truck 1.

The foregoing will, it is believed, suffice to impart a clear understanding of my invention without further explanation.

Manifestly, the invention, as described, is susceptible of modification without departing from the inventive concept, and right is herein reserved to such modifications as fall within the scope of the appended claims.

What I claim is:

1. The combination with a pair of trucks adapted to be disposed in spaced-apart relation, an extensible upright shaft mounted on each of said trucks, a sheave on the upper end of each shaft, cable means on each truck for adjusting the extensible shaft upwardly, a power winch on each truck for operating said cable means, a suspension cable having one end anchored to the upper end of one shaft with its opposite end extending over the sheave on the other shaft, a clamp having a pulley riding on said suspension cable between said sheave and said anchored end for elevating a load from said truck when the suspension cable is slackened and subsequently tensioned, said clamp being adapted to travel along said suspension cable when the suspension cable is inclined between said sheave and its anchored end, and means to connect said winch to said cable means and to said opposite end of said suspension cable, selectively, for adjusting the adjustable shaft to incline said suspension cable, and for effecting the required slack and tension in the suspension cable at will.

2. The combination with a pair of trucks adapted to be disposed in spaced-apart relation, an extensible upright shaft mounted on each of said trucks, a sheave on the upper end of each shaft, cable means on each truck for adjusting the extensible shaft upwardly, a power winch on each truck for operating said cable means, a suspension cable having one end anchored to the upper end of one shaft with its opposite end extending over the sheave on the other shaft, a clamp having a pulley riding on said suspension cable between said sheave and said anchored end for elevating a load from said truck when the suspension cable is slackened and subsequently tensioned, said clamp being adapted to travel along said suspension cable when the suspension cable is inclined between said sheave and its anchored end, and means to connect said winch to said cable means and to said opposite end of said suspension cable, selectively, for adjusting the adjustable shaft to incline said suspension cable, and for effecting the required slack and tension in the suspension cable at will, the mounting for each extensible shaft including a hollow column in which the extensible shaft is endwise slidable, and having longitudinal slots therein, said cable means including pulleys on said column and cables trained over said pulleys and connected to said extensible shaft through said slots.

VIVIAN EARLE HAMILTON, Jr.